(12) United States Patent
Porbeni et al.

(10) Patent No.: US 9,610,528 B2
(45) Date of Patent: Apr. 4, 2017

(54) FILTER FRAME ASSEMBLY WITH SEAL

(75) Inventors: Francis E. Porbeni, Woodbury, MN (US); Kenneth J. Snider, Woodbury, MN (US); Dean R. Duffy, Woodbury, MN (US); Gregory M. Jellum, Marine on St. Croix, MN (US); Richard A. Kirchner, Apple Valley, MN (US); Donald E. Young, Forest Lake, MN (US); Chris P. Manderfeld, St. Michael, MN (US); John J. Reese, Chadds Ford, PA (US)

(73) Assignee: 3M Innovative Properties Company, St. Paul, MN (US)

( * ) Notice: Subject to any disclaimer, the term of this patent is extended or adjusted under 35 U.S.C. 154(b) by 387 days.

(21) Appl. No.: 14/344,652

(22) PCT Filed: Sep. 12, 2012

(86) PCT No.: PCT/US2012/054820
§ 371 (c)(1),
(2), (4) Date: Dec. 1, 2014

(87) PCT Pub. No.: WO2013/040010
PCT Pub. Date: Mar. 21, 2013

(65) Prior Publication Data
US 2015/0075125 A1    Mar. 19, 2015

Related U.S. Application Data

(60) Provisional application No. 61/534,622, filed on Sep. 14, 2011.

(51) Int. Cl.
*B01D 46/10* (2006.01)
*B01D 46/12* (2006.01)
*B01D 46/00* (2006.01)

(52) U.S. Cl.
CPC ....... *B01D 46/125* (2013.01); *B01D 46/0002* (2013.01); *B01D 46/10* (2013.01); *B01D 2271/025* (2013.01)

(58) Field of Classification Search
CPC .. B01D 29/012; B01D 46/0001; B01D 46/10; B01D 46/521; B01D 29/016;
(Continued)

(56) References Cited

U.S. PATENT DOCUMENTS

| 3,274,759 A | 9/1966 | Bell, Jr. |
| 4,195,681 A | 4/1980 | Douglas |

(Continued)

FOREIGN PATENT DOCUMENTS

| DE | 23 60 156 | 6/1975 |
| DE | 203 13 468 U1 | 12/2004 |

(Continued)

OTHER PUBLICATIONS

VerShaw, et al., "Implications of Filter Bypass". *ASHRAE Transactions*, (2009), pp. 191.

*Primary Examiner* — Jacob T Minskey
*Assistant Examiner* — Minh-Chau Pham
(74) *Attorney, Agent, or Firm* — Aleksander Medved; Scott A. Baum

(57) ABSTRACT

A filter frame assembly is disclosed comprising a perimeter member surrounding a fluid aperture adapted to accommodate a fluid flow from an upstream direction to a downstream direction, the perimeter member comprising a perimeter upstream surface, a perimeter downstream surface, and a perimeter outer surface connecting the perimeter upstream surface to the perimeter downstream surface. A gasket carrier is attached to the perimeter member and comprises a carrier outer portion facing generally away from the fluid (Continued)

aperture and a first outer portion sealing member projecting from the carrier outer portion.

44 Claims, 13 Drawing Sheets

(58) Field of Classification Search
CPC ........... B01D 2271/02; Y10T 156/1084; Y10T 156/10; Y10T 156/101; Y10T 156/1043; Y10T 156/1052; Y10S 55/05
USPC .... 55/490, 495, 497, 500, 502, 521, DIG. 5, 55/DIG. 31; 156/60, 196, 201, 221, 250, 156/269, 324; 428/12, 543
See application file for complete search history.

(56) References Cited

U.S. PATENT DOCUMENTS

| | | | | |
|---|---|---|---|---|
| 6,162,272 A * | 12/2000 | Michaelis | .......... | B01D 46/0001 55/497 |
| 6,406,509 B1 | 6/2002 | Duffy | | |
| 6,926,781 B2 * | 8/2005 | Duffy | ................ | B01D 29/012 156/196 |
| 7,261,757 B2 * | 8/2007 | Duffy | ................ | B01D 46/0001 55/497 |
| 7,300,486 B1 * | 11/2007 | Kirsch | ................ | B01D 29/07 55/497 |
| 7,753,981 B2 * | 7/2010 | Kawano | ............. | B01D 46/0002 210/493.1 |
| 8,062,404 B2 * | 11/2011 | Volkmer | ................ | B01D 46/10 55/497 |
| 8,157,881 B1 * | 4/2012 | Anoszko | ............ | B01D 46/0005 55/481 |
| 8,425,644 B2 * | 4/2013 | Sundvik | ............... | B01D 46/125 55/484 |
| 8,518,139 B2 * | 8/2013 | Jessberger | ......... | B01D 46/0005 55/495 |
| 8,852,308 B2 * | 10/2014 | Jarrier | ................ | B01D 46/002 55/483 |
| 2003/0070406 A1 * | 4/2003 | Duffy | ................ | B01D 29/031 55/497 |
| 2003/0177745 A1 * | 9/2003 | Jauw | ................ | B01D 46/0005 55/497 |
| 2006/0091064 A1 | 5/2006 | Brown | | |
| 2006/0168926 A1 * | 8/2006 | Dawson | ................ | B01D 39/16 55/502 |
| 2007/0251201 A1 | 11/2007 | Miler | | |
| 2008/0022643 A1 | 1/2008 | Fox | | |
| 2009/0320422 A1 | 12/2009 | Braunecker | | |
| 2010/0242425 A1 | 9/2010 | Swanson | | |
| 2010/0269463 A1 | 10/2010 | Duffy | | |
| 2011/0219737 A1 * | 9/2011 | Sudermann | ............ | B01D 46/10 55/497 |
| 2014/0096494 A1 * | 4/2014 | Wiser, III | .......... | B01D 46/0097 55/502 |

FOREIGN PATENT DOCUMENTS

| | | |
|---|---|---|
| DE | 20 2008 007292 | 10/2009 |
| EP | 0 620 133 | 10/1994 |
| EP | 0 639 474 | 2/1995 |
| EP | 1 350 550 | 10/2003 |
| WO | WO 97/22394 | 6/1997 |
| WO | WO 03/078024 | 9/2003 |
| WO | WO 2011/076586 | 6/2011 |

* cited by examiner

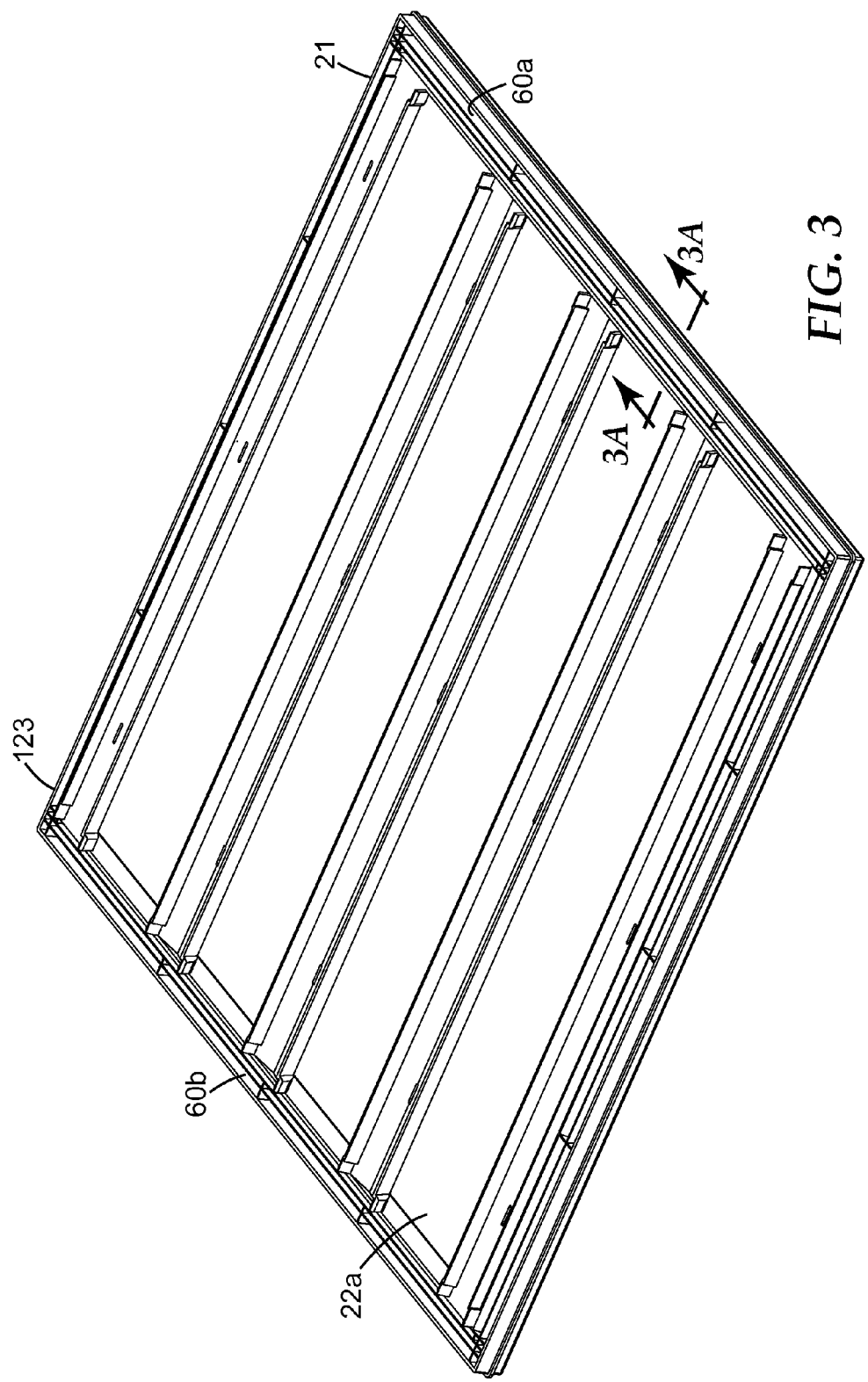

FILTER FRAME ASSEMBLY WITH SEAL

CROSS REFERENCE TO RELATED APPLICATIONS

This application is a national stage filing under 35 U.S.C. 371 of PCT/US2012/054820, filed Sep. 12, 2012, which claims priority to U.S. Provisional Patent Application No. 61/534,622, filed Sep. 14, 2011, the disclosures of which are incorporated by reference in their entirety herein.

BACKGROUND

Particulate matter in air is often undesirable (e.g., irritating to breathe, or interferes with the performance of equipment). Therefore, there is a need to remove some or all of the particulate matter from air and gas streams over extended periods of time. For example, HVAC (heating, ventilation and air conditioning) air, aircraft cabin ventilation, clean room ventilation, air to engines for motorized vehicles, or to power generation equipment, gas streams directed to gas turbines, and air streams to various combustion furnaces often include particulate material that needs to be constantly filtered or otherwise removed.

To remove particulate matter from air, filters comprising filter media and a filter frame are installed in HVAC and other systems. Efficiency is the propensity of filter media to trap, rather than pass, particulates and is generally selected to trap particles of certain sizes with certain efficiencies. For the filter media to remove particles, it is necessary for the air stream to move through the filter media (i.e., to move from the upstream to the downstream side of the filter media). In some installations, however, there may be leaks or other passageways by which the air stream can move past an installed filter without passing through the filter media. For example, there may be a hole in the filter media, a leak in the filter frame, or a leak between the filter frame and the HVAC duct into which the filter is installed. Gasketing material may be used to help reduce leakage, particularly between the filter frame and the HVAC duct. Air that moves past an installed filter without passing through the filter media will generally not have particulate matter removed from it, and thus there is a need to minimize leaks in order to achieve the intended performance, for example, the intended efficiency of particle removal of a filter in an HVAC or other system.

There is a continuing need for additional filter designs that provide desired or improved filtering efficiencies in a cost-effective manner.

SUMMARY

Filters used in HVAC systems can protect the HVAC equipment from particulate dust, reduce the operating cost of the HVAC system, and improve indoor air quality. However, in numerous air handling installations, there are gaps that create spaces for airflow to bypass the filter. Such bypass has been shown to lower the overall effectiveness of the filter to perform at its desired particle capture efficiency level. (See, e.g., VerShaw, J.; Chojnowski, D. B.; Seigel, J. A.; Nigro, P. J. Implications of Filter Bypass. *ASHRAE Transactions*, 2009, pp. 191). In places of use, the occurrence air bypass may further cause damage to cooling coils, thereby increase the cost of operating the HVAC units. In hospital environments such as infection control units where air quality is a premium, problems such as filter air bypass can compromise the health of patients. Incorporating a gasket seal onto a filter frame can mitigate such concerns.

At higher levels of filter efficiency, the effect of bypass becomes more critical due to the tendency for higher pressure drops to develop across such filters. When the filter pressure drop is higher, more fluid can bypass, making the effectiveness of the filter system more sensitive to the bypass. For filters with high levels of efficiency (e.g., MERV 13 and above), current industry practice is to include a separate gasket kit with the filter. Such kits may include four or more adhesive backed foam strips that must be applied by the installer prior to installation of the filter. The proper placement of these gaskets is specific to the installation, requiring the installer vary the attachment depending on the filter placement. Due to a lack of understanding of the importance of gaskets and the time required to attach them, the gaskets may not be applied. Filter assemblies according to the present disclosure can address these concerns by enabling consistent performance through consistent gasket use with reduced bypass, and can save time (reduced installation time because the gaskets are pre-installed and can function in multiple filter orientations and in multiple filter-rack styles).

Embodiments disclosed herein include, but are not limited to, the various embodiments described below, as may or may not be numbered for convenience.

In a first embodiment (Embodiment 1), the present disclosure provides a filter frame assembly comprising:

a perimeter member surrounding a fluid aperture adapted to accommodate a fluid flow from an upstream direction to a downstream direction, the perimeter member comprising a perimeter upstream surface, a perimeter downstream surface, and a perimeter outer surface connecting the perimeter upstream surface to the perimeter downstream surface; and a gasket carrier attached to the perimeter member and comprising a carrier outer portion facing generally away from the fluid aperture and a first outer portion sealing member projecting from the carrier outer portion.

Embodiment 2

The filter frame assembly of Embodiment 1 wherein the gasket carrier further comprises a carrier upstream portion generally facing the upstream direction.

Embodiment 3

The filter frame assembly of Embodiment 2 wherein the gasket carrier further comprises an upstream sealing member projecting from the carrier upstream portion.

Embodiment 4

The filter frame assembly of any of Embodiments 1-3 wherein the gasket carrier further comprises a carrier downstream portion generally facing the downstream direction.

Embodiment 5

The filter frame assembly of Embodiment 4 wherein the gasket carrier further comprises a downstream sealing member projecting from the carrier downstream portion.

Embodiment 6

The filter frame assembly of Embodiment 1 wherein the gasket carrier comprises a carrier upstream portion generally facing the upstream direction and a carrier downstream portion generally facing the downstream direction, the carrier outer portion connecting the carrier upstream portion to the carrier downstream portion.

Embodiment 7

The filter frame assembly of Embodiment 6 further comprising at least one of a downstream sealing member projecting from the carrier downstream portion or an upstream sealing member projecting from the carrier upstream portion.

Embodiment 8

The filter frame assembly of Embodiment 7 comprising both a downstream sealing member projecting from the carrier downstream portion and an upstream sealing member projecting from the carrier upstream portion.

Embodiment 9

The filter frame assembly of any of Embodiments 1-8 comprising a second outer portion sealing member projecting from the carrier outer portion, wherein the first outer portion sealing member is positioned more proximate the upstream direction than the second outer portion sealing member.

Embodiment 10

The filter frame assembly of any of Embodiments 1-9 wherein the perimeter member comprises four members arranged in a rectangle.

Embodiment 11

The filter frame assembly of Embodiment 10 wherein the gasket carrier comprises four portions, one portion being attached to each member of the perimeter member.

Embodiment 12

The filter frame assembly of Embodiment 11 wherein the four portions of the gasket carrier are not connected to one another.

Embodiment 13

The filter frame assembly of any of Embodiments 1-12 wherein the gasket carrier is attached to the perimeter member by an adhesive.

Embodiment 14

The filter frame assembly of any of Embodiments 1-12 wherein the gasket carrier is attached to the perimeter member by a clip feature.

Embodiment 15

The filter frame assembly of Embodiment 14 wherein the clip feature is integrally formed onto one of the gasket carrier or the perimeter member such that the clip feature slides over a clipping member on the other to secure the clip feature over the clipping member by friction.

Embodiment 16

The filter frame assembly of Embodiment 15 wherein the gasket carrier is sufficiently resilient to bend to permit the clip feature to slide over the clipping member.

Embodiment 17

The filter frame assembly of Embodiment 16 wherein the gasket carrier comprises the clip feature and the perimeter member comprises the clipping member.

Embodiment 18

The filter frame assembly of any of Embodiments 1-12 wherein the gasket carrier is attached to the perimeter member by a snap feature.

Embodiment 19

The filter frame assembly of Embodiment 18 wherein the snap feature comprises a recess on one of the perimeter member or the gasket carrier and a protrusion on the other to snap into the recess.

Embodiment 20

The filter frame assembly of Embodiment 19 wherein the gasket carrier is sufficiently resilient to bend to permit the protrusion and the recess to snap together.

Embodiment 21

The filter frame assembly of any of Embodiments 19-20 wherein the perimeter member comprises a recess and the gasket carrier comprises a protrusion.

Embodiment 22

The filter frame assembly of Embodiment 21 wherein the perimeter member comprises a recess on each of the perimeter upstream surface and the perimeter downstream surface; and wherein the gasket carrier comprises a protrusion projecting inwardly from the carrier upstream portion to snap into the recess on the perimeter upstream surface and a protrusion projecting inwardly from the carrier downstream portion to snap into the recess on the perimeter downstream surface.

Embodiment 23

The filter frame assembly of any of Embodiments 1-12 wherein the gasket carrier is attached to the perimeter member by a press feature.

Embodiment 24

The filter frame assembly of Embodiment 23 wherein the press feature comprises a reception channel on one of the perimeter member or the gasket carrier and a plug on the other to press into the reception channel.

Embodiment 25

The filter frame assembly of Embodiment 24 wherein the perimeter member comprises a reception channel and the gasket carrier comprises a plug.

Embodiment 26

The filter frame assembly of any of Embodiments 24-25 wherein plug comprises one or more retention features to cooperate with an inner wall of the reception channel to resist removal of the plug from the reception channel.

Embodiment 27

The filter frame assembly of any of Embodiments 1-12 wherein the perimeter member defines a perimeter direction along the perimeter member, wherein the gasket carrier is attached to the perimeter member by a slide feature such that the gasket carrier slides onto the perimeter member along the perimeter direction.

Embodiment 28

The filter frame assembly of Embodiment 27 wherein the slide feature comprises a slot on one of the perimeter member or the gasket carrier and a rail on the other to slide into the slot.

Embodiment 29

The filter frame assembly of Embodiment 28 wherein the perimeter member comprises a slot and the gasket carrier comprises a rail.

Embodiment 30

The filter frame assembly of any of Embodiments 28-29 wherein the slot and the rail cooperate in a dovetail configuration.

Embodiment 31

The filter frame assembly of any of Embodiments 6-30 wherein the gasket carrier comprises independent first and second carrier portions, the first carrier portion comprising a carrier upstream portion and a portion of the carrier outer portion; the second carrier portion comprising a carrier downstream portion and the remaining portion of the carrier outer portion.

Embodiment 32

The filter frame assembly of Embodiment 31 comprising both a downstream sealing member projecting outwardly from the carrier downstream portion and an upstream sealing member projecting outwardly from the carrier upstream portion.

Embodiment 33

The filter frame assembly of any of Embodiments 31-32 comprising a second outer portion sealing member projecting from the carrier outer portion, wherein the first outer portion sealing member is positioned on the first carrier portion and the second outer portion sealing member is positioned on the second carrier portion.

In a thirty-fourth embodiment (Embodiment 34), the present disclosure provides a filter frame assembly comprising:

a perimeter member surrounding a fluid aperture, the perimeter member comprising a perimeter upstream surface, a perimeter downstream surface, and a perimeter outer surface connecting the perimeter upstream surface to the perimeter downstream surface; and a gasket carrier attached to the perimeter member by a snap feature and comprising a carrier upstream portion, a carrier downstream portion, and a carrier outer portion connecting the carrier upstream portion to the carrier downstream portion; the gasket carrier further comprising:
 a first outer portion sealing member projecting outwardly from the carrier outer portion;
 a downstream sealing member projecting outwardly from the carrier downstream portion; and
 an upstream sealing member projecting outwardly from the carrier upstream portion;
the snap feature comprising a recess on each of the perimeter upstream surface and the perimeter downstream surface, a protrusion projecting inwardly from the carrier upstream portion to snap into the recess on the perimeter upstream surface, and a protrusion projecting inwardly from the carrier downstream portion to snap into the recess on the perimeter downstream surface, wherein the gasket carrier is sufficiently resilient to bend to permit the protrusions and the recesses to snap together.

In a thirty-fifth embodiment (Embodiment 35), the present disclosure provides a filter assembly comprising the filter frame assembly according to any of Embodiments 1-34 comprising a filter media spanning the fluid aperture.

Embodiment 36

The filter assembly of Embodiment 35 wherein the filter media comprises two sections arranged in a V-pattern having an open portion and a closed portion, wherein the open portion corresponds to a fluid aperture.

Embodiment 37

The filter assembly of Embodiment 36 wherein the filter media comprises four sections arranged in a successive V-pattern having an open portion and a closed portion, wherein each open portion corresponds to a fluid aperture.

In a thirty-eighth embodiment (Embodiment 38), the present disclosure provides a filter frame assembly comprising:

a cage comprising a perimeter member surrounding at least two fluid apertures, the at least two fluid apertures being generally traversed by at least one primary cross member, at least one secondary cross member having a first end and a second end, and first and second wall members each having a first and second end, wherein each first end of each wall member is connected to the perimeter member and each second end of each wall member is respectively connected to the first and second ends of the at least one secondary cross member, the perimeter member comprising:
 a perimeter upstream surface, a perimeter downstream surface, and a perimeter outer surface connecting the perimeter upstream surface to the perimeter downstream surface;

a gasket carrier attached to the perimeter member and comprising a carrier outer portion facing generally away from the fluid apertures and a first outer portion sealing member projecting from the carrier outer portion; and a filter element having at least four sections;

wherein the cage generally surrounds the filter element, wherein the at least four sections of the filter element are arranged in a successive V-pattern having an open portion and a closed portion, wherein each open portion corresponds to a fluid aperture and each closed portion corresponds to a secondary cross member; and wherein each section of the filter element is secured in sealing relation to adjacent sections and to the cage.

Embodiment 39

The filter frame assembly of Embodiment 38, wherein the perimeter member comprises polymeric material comprising at least one of acrylonitrile butadiene styrene, polycarbonate, or high impact polystyrene.

Embodiment 40

The filter frame assembly of any of Embodiments 38-39, wherein the first and second wall members each comprise polymeric material independently comprising at least one of acrylonitrile butadiene styrene, polycarbonate, or high impact polystyrene.

Embodiment 41

The filter frame assembly of any of Embodiments 38-40, wherein the sealing relation of each section of the filter element to adjacent sections and to the cage is provided at least in part by an adhesive comprising at least one of a hot melt adhesive or a curable adhesive.

Embodiment 42

The filter frame assembly of any of Embodiments 38-41, wherein each of the at least four sections of the filter element is a discrete pleat pack.

Embodiment 43

The filter frame assembly of any of Embodiments 38-42, wherein the perimeter member further comprises at least one male engagement feature or female reception feature, and the first end of each wall member further comprises at least one corresponding male engagement feature or female reception feature, wherein each male engagement feature is engaged with a corresponding female reception feature.

Embodiment 44

The filter frame assembly of any of Embodiments 38-43, wherein the second end of each wall member further comprises at least one male engagement feature or female reception feature, and the at least one secondary cross member further comprises at least one corresponding male engagement feature or female reception feature, wherein each male engagement feature is engaged with a corresponding female reception feature.

Embodiment 45

The filter frame assembly of any of Embodiments 38-44, further comprising at least one flow directing member connected to each at least one primary cross member.

In some embodiments, the present disclosure provides a filter frame assembly comprising a perimeter member having at least one (e.g., in some embodiments, two, three, four, or five) fluid aperture. In embodiments comprising more than one fluid aperture, such fluid apertures are generally traversed by at least one (e.g., in some embodiments, two three, or four) primary cross member.

In some embodiments, the filter frame may further comprise a cage comprising a perimeter member having at least one (e.g., in some embodiments, two, three, four, or five) fluid aperture. In embodiments comprising more than one fluid aperture, the fluid apertures are generally traversed by at least one (e.g., in some embodiments, two three, or four) primary cross member. In the cage configuration, the fluid apertures may be further traversed by at least one (e.g., in some embodiments, two three, four, or five) secondary cross member having a first end and a second end. In embodiments comprising multiple apertures, there will typically be one secondary cross member present for each fluid aperture in the perimeter member.

In such cage configurations, the filter frame may further comprise first and second wall members each having a first and second end, wherein each first end of each wall member is connected to the perimeter member and each second end of each wall member is respectively connected to the first and second ends of the at least one secondary cross member; and a filter element (in some embodiments, for example, two three, or four filter elements) having at least four sections;

wherein the cage generally surrounds the filter element, wherein the at least four sections of the filter element are arranged in a successive V-pattern having an open portion and a closed portion, wherein each open portion corresponds to a fluid aperture and each closed portion corresponds to a secondary cross member; and wherein each section of the filter element is secured in sealing relation to adjacent sections and to the cage (e.g., via an adhesive material).

In some embodiments, each section of the filter element is a discrete pleat pack. In some embodiments, each section of the filter element comprises at least one (in some embodiments, for example, two three, four, or five) filter media formed into a plurality of pleats.

In some embodiments, the perimeter member further comprises at least one (in some embodiments, for example, two three, four, five, six, seven, eight, nine, or even up to ten) male engagement feature or female reception feature, and the first end of each wall member further comprises at least one corresponding male engagement feature or female reception feature, wherein each male engagement feature is engaged with a corresponding female reception feature.

In some embodiments, the second end of each wall member further comprises at least one (in some embodiments, for example, two three, four, five, six, seven, eight, nine, or even up to ten) male engagement feature or female reception feature, and the at least one secondary cross member further comprises at least one corresponding male engagement feature or female reception feature, wherein each male engagement feature is engaged with a corresponding female reception feature.

In some embodiments, the perimeter member comprises an outer surface, the filter frame assembly further comprising at least one flow (in some embodiments, for example, two three, four, or five) directing member connected the outer surface of the perimeter member and each at least one (in some that have assembly joints that may become embodiments, for example, two three, or four) primary cross member.

In some embodiments, the perimeter member is unitary—i.e., is constructed of a single part. A unitary perimeter member may provide a number of advantages. For example, the unitary perimeter member may simplify assembly (e.g., reduce the number of assembly steps) of a filter frame compared to perimeter members that are assembled from two or more parts. For example, a unitary perimeter member may be manufactured in a single step by injection molding or the like. The unitary perimeter member may, for example, reduce or minimize leakage that could occur at joints or in joining materials found in perimeter members that are assembled from two or more parts. The unitary perimeter member may, for example, provide improved structural integrity compared to multi-piece perimeter members. Additionally, for example, the unitary perimeter member may have a lighter weight than a perimeter member assembled from two or more parts. Further, for example, the unitary perimeter member may be formed from one material (e.g. a polymer resin), and may be incinerable, particularly if other members of the filter frame are made from the same material.

In some instances, particularly where the perimeter member is unitary as described in the preceding paragraph, it may not be feasible or cost effective to include integral gasketing on the frame simultaneous with manufacture. For example, an efficient way of manufacturing gasketing material is extrusion, but a unitary perimeter member as described above cannot feasibly be manufactured by extrusion. Therefore, provision of an independent gasket carrier as disclosed herein in combination with a unitary perimeter member can provide synergy and advantages over known filter frames and gasket combinations. For example, such a combination allows simultaneous realization of the advantages of both unitary perimeter member and integral gasketing by permitting a rigid, easy to manufacture perimeter member with sealing measures that do not require assembly by an installer.

It is also contemplated that a perimeter member according to the present disclosure may be comprised of a particularly rigid material (irrespective of whether the perimeter member is unitary or not) such that provision of integral sealing or gasketing, such as by coextrusion, is not feasible. For example, if a perimeter member is comprised of aluminum, steel, wood, or other non-polymeric material, it may be difficult or impossible to coextrude polymeric sealing members along with the perimeter member. Such difficulty may also exist where incompatible (or difficult to combine) polymers are desired for the perimeter member and the sealing members. Such issues may be overcome by provision of an independent gasket carrier as disclosed herein.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein:

FIG. 3 is a partial perspective view of the underside of the perimeter member shown in FIGS. 1, 1A, 2, and 2A;

DETAILED DESCRIPTION

The present disclosure provides filters and filter frame assemblies 10 useful in the filtration of fluids. Embodiments of filter frame assembly 10 according to the present disclosure may be useful in several types of filter assemblies such as, for example, cabin air filters, bag filters, residential and commercial Heating Ventilation Air Conditioning (HVAC) filters, air intake filters for electronic equipment, engine intake air filters, and the like. Filters for fluids other than air, including liquids and other gases, should be considered within the scope of the present disclosure.

Figure 7:
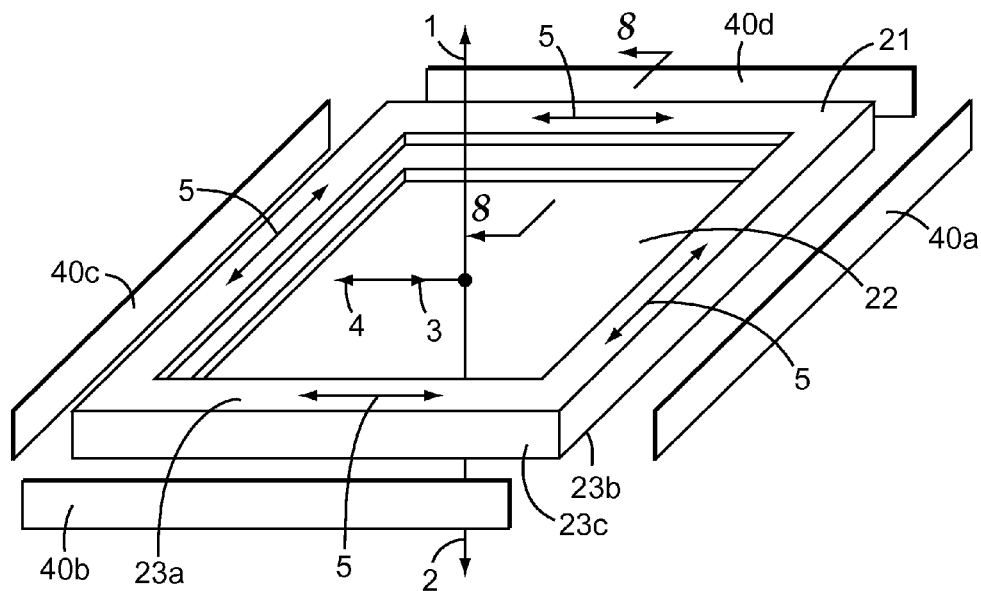
FIG. 7 is an exploded perspective view of an exemplary filter frame assembly perimeter member according to the present disclosure.
Figure 8:
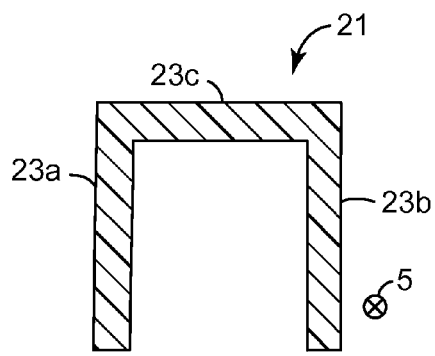
FIG. 8 is a cross-section view taken at 8-8 of FIG. 7 of an exemplary perimeter member according to the present disclosure.
Figure 9:
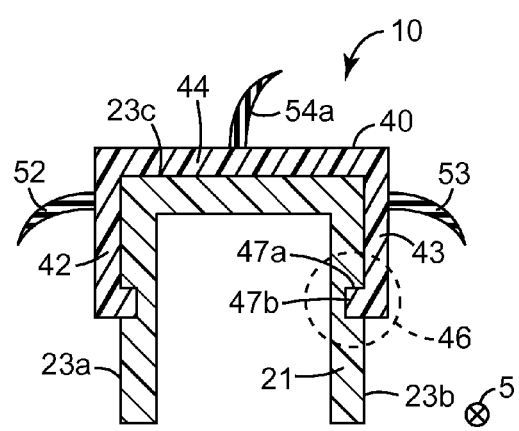
FIGS. 9-19 are cross-section views taken at 8-8 of FIG. 7 of exemplary filter frame assemblies according to the present disclosure.

Referring to, for example, FIGS. 7-9, filter frame assembly 10 may comprise a perimeter member 21 surrounding one or more fluid apertures 22 (or 22a-22d) and may further comprise a gasket carrier 40 attached to the perimeter member 21.

The perimeter member 21 may be provided in a variety of shapes such as circles, ellipses, triangles, rectangles, squares, parallelograms, trapezoids, or other polygons depending on the shape of the duct or other fluid passage that the filter is to be installed into. In embodiments where the perimeter member 21 is provided in shape comprising discrete sides 89a (for example, a rectangle), the gasket carrier 40 may comprise independent carrier portions 40a, 40b, 40c, 40d, etc., (i.e., one for each side of the shape). In some embodiments, the independent carrier portions remain separate from one another even after the gasket carrier 40 is installed onto the perimeter member 21.

The perimeter member 21, as well as other components of embodiments discussed herein, can be made using conventional materials and general construction techniques known in the art. In many embodiments, it is desirable to make the perimeter member 21 (and other frame components) from polymeric materials. Exemplary polymeric materials for the perimeter member 21, perimeter member 21, and gasket carrier 40 (and also for secondary cross member 26, wall members 28, gasket landing and flow directing members 70a, as discussed elsewhere herein) include thermoplastics such as acrylonitrile butadiene styrene, polycarbonate, polystyrene, high impact polystyrene, polypropylene, polyethylene, nylon, and combinations thereof, and thermosetting resins such as phenol formaldehyde, epoxy, polyester, and combinations thereof. Such polymeric components may be made by techniques known in the art, including injection molding of the resin into a molding tool. Optionally, fillers or additives may be added to the exemplary polymeric materials listed above. Exemplary fillers and additives include talc, clay, calcium carbonate, crushed mineral, ground glass, glass beads, glass bubbles, glass fibers, carbon black, carbon fibers, crushed walnut shells, and crushed peanut shells. Many other fillers are known in the art. In some embodiments, it may be desirable to make frame components from metal. Exemplary metals include sheet metal, cold rolled steel, stainless steel, and aluminum. In some embodiments, it may be desirable to make frame components from recycled paper products (e.g., cellulose).

The gasket carrier 40 is a member initially separate from the perimeter member 21 and is configured to install onto the perimeter member 21. The gasket carrier 40 may install onto the perimeter member 21 in a number of ways within the scope of the present disclosure, so long as such attachment method permits secure, sealing attachment of the gasket carrier 40 during use of the filter. Such attachment methods include, but are not limited to, those described below as shown in the accompanying figures.

To aid in describing various embodiments, FIG. 7 depicts a coordinate system defining several directions that may be used herein to describe features. As shown, the coordinate system defines an upstream direction 1, a downstream direction 2, an inward direction 3, an outward direction 4, and a perimeter direction 5. The upstream direction 1 and the downstream direction 2 are defined relative to the direction of fluid flow in use of an exemplary filter—i.e., a fluid will flow from the upstream direction 1 to the downstream direction 2. The inward direction 3 and the outward direction 4 are defined relative to the one or more fluid apertures 22 (or 22a-22d) in the filter frame assembly 10—i.e., the inward direction 3 faces toward the fluid aperture(s) 22 and the outward direction 4 faces away from the fluid aperture(s) 22. The perimeter direction 5 is defined as parallel to the path of the perimeter member 21 as it surrounds the fluid aperture(s) 22. The perimeter direction 5 encompasses both directions along such path—i.e., both into and out of the page when viewing FIGS. 8 and 9.

In some embodiments, such as those shown FIGS. 7, 8, 20A, and 20B, the perimeter member 21 comprises a perimeter upstream surface 23a, a perimeter downstream surface 23b, and a perimeter outer surface 23c connecting the perimeter upstream surface 23a to the perimeter downstream surface 23b. It should be understood that one or more of these surfaces may be absent in whole or in part from the perimeter member 21 while remaining within the scope of the present disclosure. Typically, the gasket carrier 40 comprises a carrier outer portion 44 facing in the outward direction 4 generally away from the fluid aperture 22 (or 22a-22d) and a first outer portion sealing member 54a projecting from the carrier outer portion 44. In several embodiments, the gasket carrier 40 is attached to the perimeter outer surface 23c. Typically, the gasket carrier 40 is installed such that the carrier outer portion 44 corresponds to the perimeter outer surface 23c.

In some embodiments, the gasket carrier 40 further comprises a carrier upstream portion 42 generally facing the upstream direction 1. In a typical assembly, the gasket carrier 40 is installed such that the carrier upstream portion 42 corresponds to the perimeter upstream surface 23a. In some such embodiments, the gasket carrier 40 further comprises an upstream sealing member 52 projecting from the carrier upstream portion 42. Typically, at least one component of the upstream sealing member 52 projects from the carrier upstream portion 42 in the upstream direction 1.

In some embodiments, the gasket carrier 40 further comprises a carrier downstream portion 43 generally facing the downstream direction 2. In a typical assembly, the gasket carrier 40 is installed such that the carrier downstream portion 43 corresponds to the perimeter downstream surface 23b. In some such embodiments, the gasket carrier 40 further comprises a downstream sealing member 53 projecting from the carrier downstream portion 43. Typically, at least one component of the downstream sealing member 53 projects from the carrier downstream portion 43 in the downstream direction 2.

In some embodiments, the gasket carrier 40 comprises both a carrier upstream portion 42 and a carrier downstream portion 43 such that the carrier outer portion 44 connects the carrier upstream portion 42 to the carrier downstream portion 43. In some such embodiments, the gasket carrier 40 may comprise one or both of a downstream sealing member 53 or an upstream sealing member 52 as described above.

In some embodiments, multiple sealing members may be employed on any or all of the carrier upstream portion 42, the carrier downstream portion 43, or the carrier outer portion 44. In one embodiment, a second outer portion sealing member 54b projects from the carrier outer portion 44, wherein the first outer portion sealing member 54a is positioned more proximate the upstream direction 1 than the second outer portion sealing member 54b.

Figure 21A:
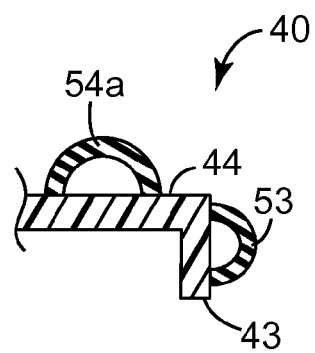
FIGS. 21A-21D are cross-section views taken at 8-8 of FIG. 7 of exemplary gasket carriers comprising sealing members according to the present disclosure.
Figure 21B:
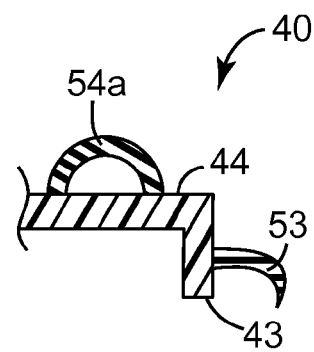
Figure 21C:
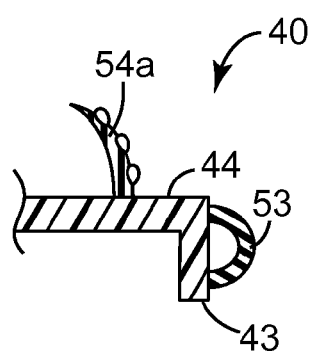
Figure 21D:
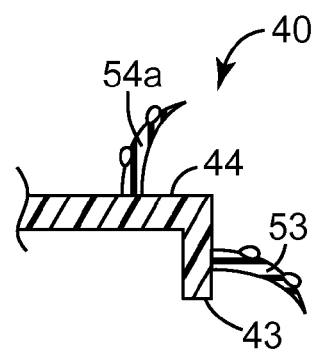

Upstream, downstream, and first and second outer sealing members, where provided alone or in any combination, may comprise a multitude of varying seal types. Several examples of sealing members suitable for use on gasket carriers according to the present disclosure are described in U.S. Pat. No. 7,261,757 to Duffy, entitled "Slip Rib Filter Gasketing," the disclosure of which is hereby incorporated by reference in its entirety. For example, any sealing member (e.g., 52, 53, 54a, 54a) according to the present disclosure may comprise one or more longitudinally extending ribs (labeled item 76 in Duffy) as described in Duffy '757 to assist in sealing and to further assist with insertion of the filter frame assembly 10 into a corresponding duct (see, e.g., FIGS. 21C and 21D of the present disclosure). The same or different types of sealing members may be provided at the same time on a single gasket carrier 40. As described in Duffy '757 in col. 3, such longitudinally extending ribs may be formed of a relatively low friction material such as a thermoplastic polymer. Several exemplary sealing members and combinations thereof of shown in FIGS. 21A-21D. In some embodiments, the one or more sealing members are integrally formed with the gasket carrier 40. In one such embodiment, the one or more sealing members are co-extruded along with the gasket carrier 40.

Figure 5:
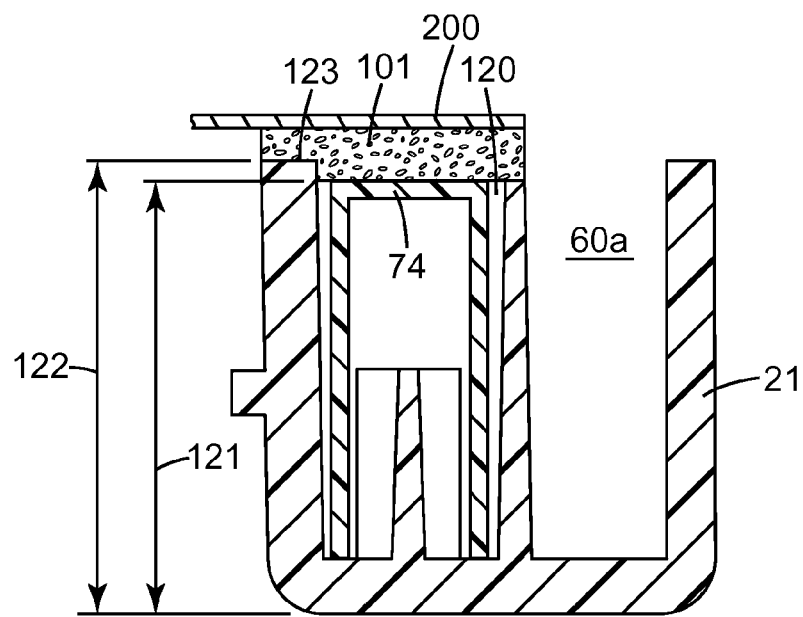
FIG. 5 is a cross-sectional view of a portion of the perimeter member shown in FIG. 3A with an exemplary filter gasket landing.

Providing a sealing member, or multiple sealing members in multiple orientations, can provide versatility by permitting a filter frame assembly 10 to seal into a duct in a number of ways, as shown, for example, in FIG. 5 of Duffy '757. For example, a filter frame assembly 10 may be installed into a duct in the downstream direction 2, in the upstream direction 1, or in a direction orthogonal to the upstream and downstream directions. Provision of sealing members on the appropriate portions of the gasket carrier 40 can ensure that a sealing member is present to provide a seal against a corresponding duct wall in any of these installation directions.

Figure 20A:
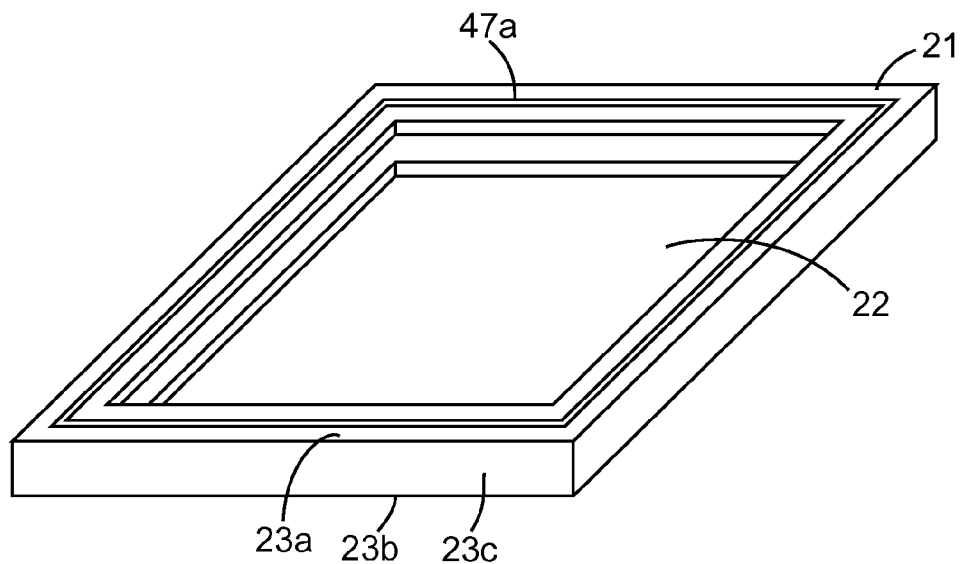
FIGS. 20A and 20B are perspective views of exemplary perimeter members according to the present disclosure.
Figure 20B:
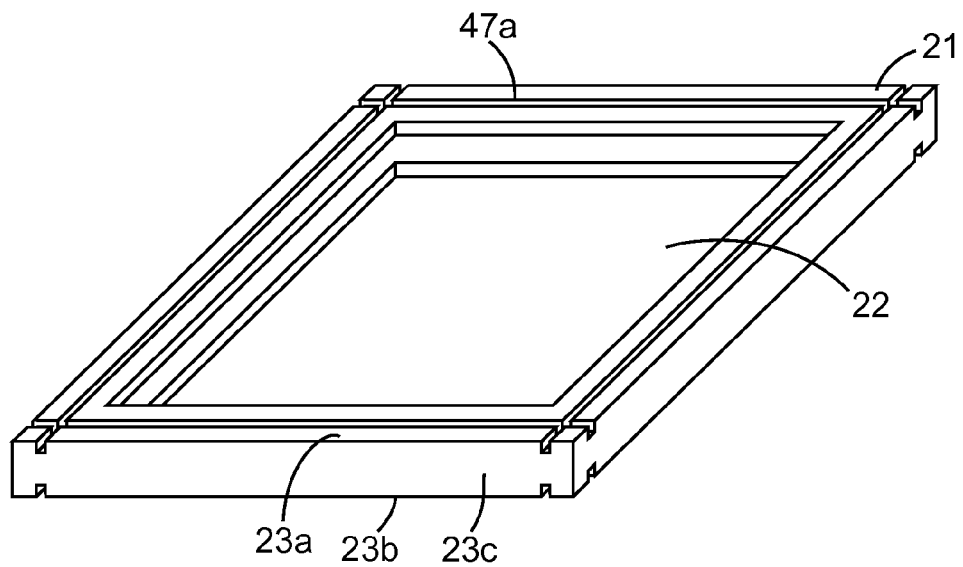

Referring now to FIG. 9 In some embodiments, a snap feature 46 may be employed to secure the gasket carrier 40 to the perimeter member 21. In such embodiments, one of the gasket carrier 40 or the perimeter member 21 may be provided with a protrusion 47b, and the other with a recess 47a into which the protrusion can extend to snap the parts together. In the embodiment depicted in FIG. 9, a protrusion 47b is provided on the gasket carrier 40 and the gasket carrier 40 is made sufficiently resilient to allowing bending or deformation of the gasket carrier 40 such that the protrusion 47b may be moved into position around the perimeter member 21 to permit the protrusion to first align with the recess 47a before being permitted to bend or deform back to its original shape to snap into the recess 47a. In one such embodiment, the recess 47a on the perimeter member 21 is provided as a groove along one or both the perimeter upstream surface 23a or the perimeter downstream surface 23b. Such a groove is shown in FIGS. 20A and 20B. In the embodiment shown in FIG. 20A, the recess 47a comprises a continuous groove around the entire rectangular perimeter member 21. As shown, the recess 47a is provided as a groove that changes direction at each corner of the rectangle such that the groove does not extend through the perimeter outer surface 23c at any point along the perimeter. However, an embodiment as shown in FIG. 20B is also contemplated, wherein the recess 47a is provided as a groove that extends through the perimeter outer surface 23c. In such embodiments, a snap feature 46 or (as discussed below) a slide feature 64 may be employed. 22. In one embodiment, the perimeter member 21 comprises a recess 47a on each of the perimeter upstream surface 23a and the perimeter downstream surface 23b and the gasket carrier 40 comprises a protrusion 47b projecting inwardly from the carrier upstream portion 42 to snap into the recess 47a on the perimeter upstream surface 23a and a protrusion 47b projecting inwardly from the carrier downstream portion 43 to snap into the recess 47a on the perimeter downstream surface 23b. It should be understood that, depending on the recess configuration, the embodiment shown in FIG. 9 could work as a slide feature 64 rather than a snap feature 46.

Figure 10:
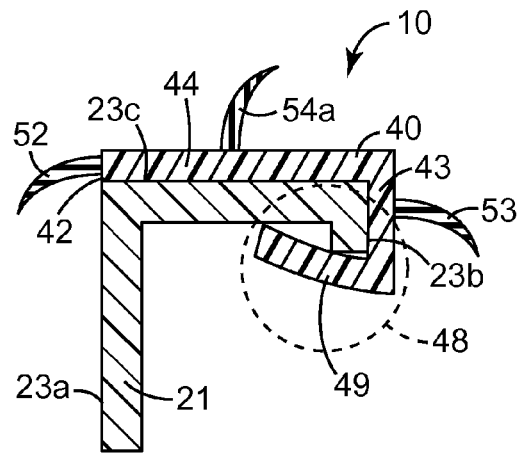

In some embodiments, such as the one depicted in FIG. 10, a clip feature 48 may be employed to secure the gasket carrier 40 to the perimeter member 21. In such embodiments, one of the gasket carrier 40 or the perimeter member 21 may comprise a clip feature 48, and the other a clipping member 49 to which the clip feature 48 may be secured. In one embodiment, the clip feature 48 comprises a living hinge formed as an integral part of the gasket carrier 40 and configured to bend or deform to an extent sufficient to conform to the clipping member 49 and hold the parts together by way of friction. In the embodiment depicted in FIG. 10, the clipping member 49 comprises a protruding feature that the clip feature 48 must be clipped over. Preferably, any protruding feature on the clipping member 49 is sufficiently small such that clipping the parts together can be readily accomplished by hand, without the aid of tools.

Figure 11:
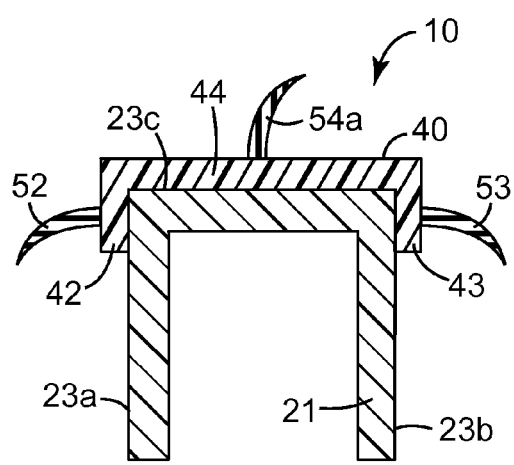

In one embodiment, such as the one depicted in FIG. 11, the gasket carrier 40 attaches to the perimeter member 21 by friction alone, on the absence of a clip feature 48. For example, the gasket carrier 40 may be provided in a "C" shape that simply slides onto the perimeter member 21 and is held in place by virtue of the two legs of the "C" (i.e., the upstream portion 42 and downstream portion 43 of the gasket carrier 40) pressing inwardly against the upstream and downstream surfaces of the perimeter member 21. Such attachment may provide sufficiently reliable connection where, for example, a duct into which the filter frame assembly 10 is eventually installed may serve to assist in holding, or capturing, the gasket carrier 40 in place while in use.

Figure 12:
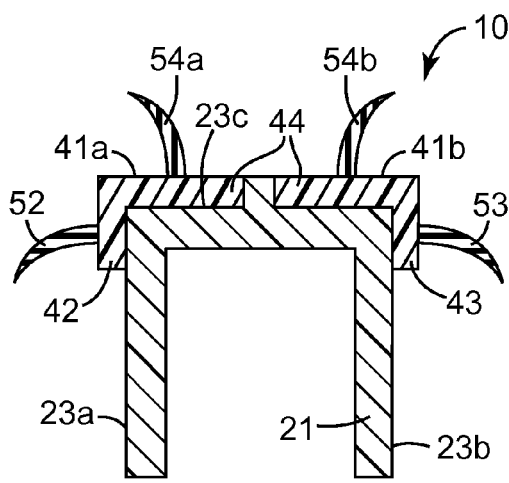

In the embodiment shown in FIG. 12 the gasket carrier 40 comprises independent first carrier portion 41a and second carrier portion 41b, the first carrier portion 41a comprising a carrier upstream portion 42 and a portion of the carrier outer portion 44, and the second carrier portion 41b comprising a carrier downstream portion 43 and the remaining portion of the carrier outer portion 44. In such embodiments, it is envisioned that the first and second carrier portions 41a and 41b may be attached to the perimeter member 21 by an adhesive 11, a magnet, or any other attachment method contemplated herein. For example, independent, snap, clip, or slide features, or combinations thereof, may be provided for each carrier portion 41a or 41b to permit it to securely attach to the perimeter member 21. In some such embodiments, a downstream sealing member 53 projects outwardly from the carrier downstream portion 43 and an upstream sealing member 52 projecting outwardly from the carrier upstream portion 42 (where individually present). In the embodiment shown in FIG. 12, a second outer portion sealing member 54b projects from the carrier outer portion 44, wherein the first outer portion sealing member 54a is positioned on the first carrier portion 41a and the second outer portion sealing member 54b is positioned on the second carrier portion 41b.

Figure 14:
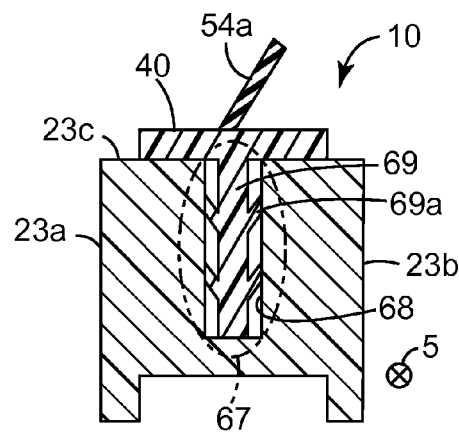
Figure 15:
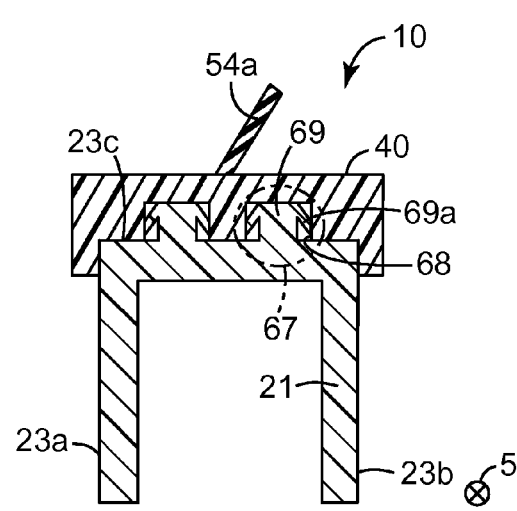
Figure 16:
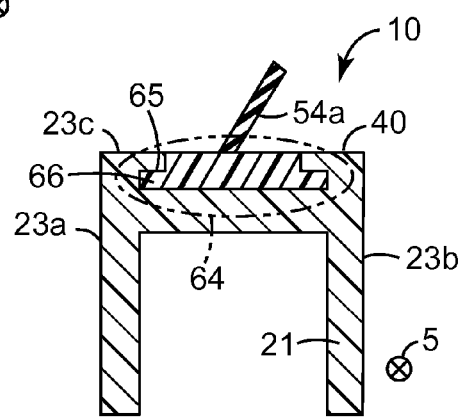
Figure 17:
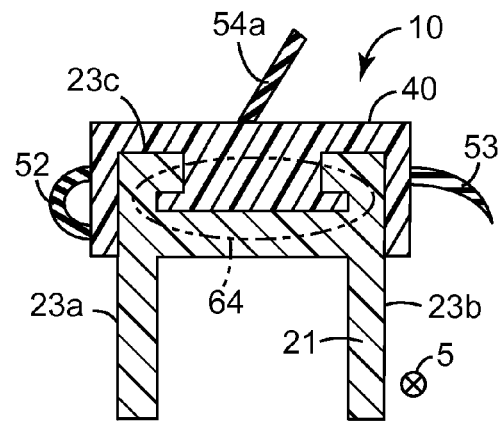
Figure 18:
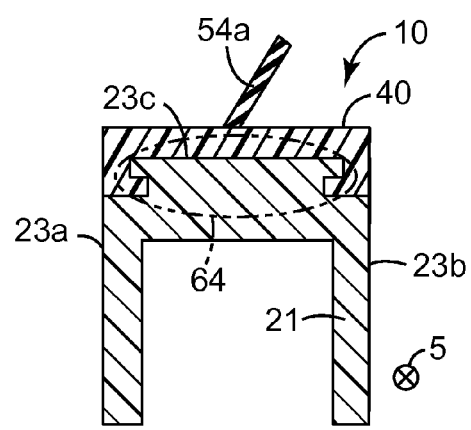
Figure 19:
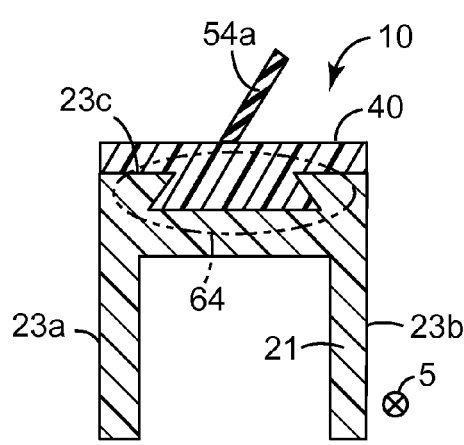

Referring now to FIGS. 14-15, the gasket carrier 40 may be installed into the perimeter member 21 by way of a press feature 67. The press feature 67 may comprise one or more reception channels 68 on one of the perimeter member 21 or the gasket carrier 40 and one or more plugs 69 on the other to press into the one or more reception channels 68. As shown in FIG. 14, the perimeter member 21 comprises a reception channel 68 and the gasket carrier 40 comprises a plug 69. As shown in FIG. 15, the perimeter member 21 comprises a two plugs 69 and the gasket carrier 40 comprises two reception channels 68. In some embodiments, a plug 69 may comprise one or more retention features 69a to cooperate with an inner wall of the reception channel 68 to resist removal of the plug 69 from the reception channel 68. In one embodiment, the retention features 69a comprise one or more tines each having an attached end attached to the plug 69 and distal end to engage a wall of the reception channel 68. Such tines may be backwardly-swept such that the plug 69 may be inserted into the reception channel 68 with relative ease, but is more difficult to remove from the channel 90 due to the tendency for the tines to "bite" into the reception channel 68 wall. In other embodiments, a plug 69 may comprise, for example, a deformable material that could be compressed upon insertion into the reception channel 68 and then expand outwardly against the reception channel 68 wall to provide a frictional force against removal of the plug 69 from the reception channel 68.

In some embodiments, such as those shown in FIGS. 16-19, the gasket carrier 40 may be installed in the perimeter member 21 by way of a slide feature 64. In such embodiments, the gasket carrier 40 is attached to the perimeter member 21 by a slide feature 64 such that the gasket carrier 40 slides onto the perimeter member 21 along the perimeter direction 5. In embodiments where the perimeter member 21 comprises multiple sides, there may be a slide feature 64 present on each side and an independent carrier portion 40*a*, 40*b*, 40*c*, 40*d*, etc. may attach to each side. In some embodiments, the slide feature 64 comprises a slot 65 on one of the perimeter member 21 or the gasket carrier 40 and a rail 66 on the other to slide into the slot 65. The slot 65 and rail 66 may have any complementary shape such that the rail 66 is securely retained by the slot 65, thereby securely attaching the gasket carrier 40 to the perimeter member 21. In one embodiment, the perimeter member 21 comprises a slot 65 and the gasket carrier 40 comprises a rail 66. In some embodiments, such as the one shown in FIG. 19, the slot 65 and the rail 66 cooperate in a dovetail configuration.

Where a slot 65 is provided in the perimeter member 21 and a rail 66 on the gasket carrier 40, at least one longitudinal end of the slot 65 should be accessible to the rail 66 in order for the rail 66 to access the slot 65 for proper attachment. Therefore, in such embodiments, it may be preferred to provide the perimeter member 21 with a slot 65 that extends through the perimeter outer surface 23*c* in at least one direction along the perimeter direction 5.

Figure 13:
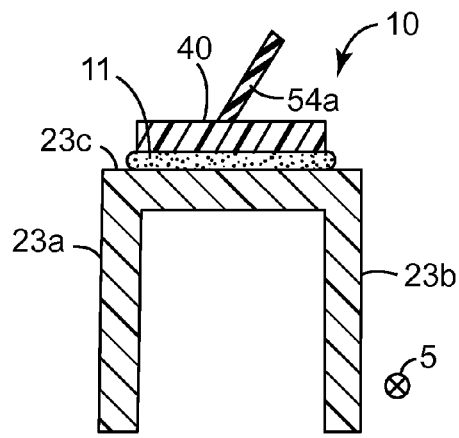

In one embodiment, such as the one depicted in FIG. 13 the gasket carrier 40 is attached to the perimeter member 21 with an adhesive 11. The adhesive 11 may be provided as part of the gasket carrier 40. For example, a pressure sensitive adhesive 11 may be provided on the gasket carrier 40 for quick installation onto the perimeter member 21. In other embodiments, the adhesive 11 may comprise, for example, a hot melt adhesive 11 that is first applied to either or both the gasket carrier 40 and the perimeter member 21 before bringing the parts together. Other adhesives known to those skilled in the art, including adhesives described elsewhere in this disclosure, may also be employed.

In one embodiment (not shown), the gasket carrier 40 attaches to the perimeter member 21 by way of one or magnets providing an attractive force between the two parts. In some such embodiments, the one or more magnets are provided as magnetic strips along the perimeter.

It should be understood that, in some of the embodiments, various attachment methods may be used in combination to aid in securing the gasket carrier 40 to the perimeter member 21. By way of example only, embodiments may be constructed wherein the gasket carrier 40 is be attached to the perimeter member 21 by a combination of an adhesive 11 and a snap feature 46, or by a combination of a press feature 67 and a snap feature 46.

Any of the filter frame assemblies described above may be provided in a filter assembly 9 with a filter media 36 spanning the fluid aperture 22. Where multiple fluid apertures 22 are provided, a single filter media 36 may be provided to span the fluid apertures 22, or multiple filter media 36 may be provided to span each fluid aperture 22. The filter media 36 may comprise a filter bag, a pleat pack, a planar media, or any other filter media 36 useful for a given application. In one embodiment, the filter media 36 comprises two sections 30*a* arranged in a v-pattern having an open portion and a closed portion, wherein the open portion corresponds to a fluid aperture 22 (or 22*a*-22*d*). In another embodiment, the filter media 36 comprises four sections 30*a* arranged in a successive v-pattern having an open portion and a closed portion, wherein each open portion corresponds to a fluid aperture 22 (or 22*a*-22*d*).

Filter media 36 may be made of materials known in the art for such use, including fiberglass, synthetics (polymers), natural fibers, and combination thereof. Filter media 36 of various efficiencies, including composite filter media 36 comprising two materials of two efficiencies (e.g., a fine fiber and a coarse fiber) as are known the art. Exemplary filter media usable in filters according to the present disclosure is described, for example, in U.S. Pat. Pub. Nos. 2010/0269463 A1 to Duffy et al. (entitled "JOINED FILTER MEDIA PLEAT PACKS") and 2008/0022643 A1 to Fox et al. (entitled "PLEATED FILTER WITH BIMODAL MONOLAYER MONOCOMPONENT MEDIA"), the disclosures of which are hereby incorporated by reference in their entirety. By way of example only, filter media described as "Web 1" and "Pleated Filter Media" in Duffy et al. (paragraphs [0035]-[0037] and [0041]-[0042]) may be employed with filters described herein. As another example, filter media described as "EXAMPLE 1" in Fox et al. (paragraphs [0084]-[0095]) may be employed with filters described herein. Any other filter media described in Duffy et al. and Fox et al. may also be employed, and the particular filter media described above should not be considered limiting. Filter media 36 efficiencies may be measured, for example, by standard methods (e.g., American Society of Heating, Refrigerating and Air Conditioning Engineers (ASHRAE) 52.2-1999 test standard "Method of Testing General Ventilation Air-Cleaning Devices for Removal Efficiency by Particle Size," the disclosure of which is incorporated herein by reference). A wide variety of filter media 36 are available from suppliers, including filter media 36 available under the trade designation "INTREPID" (e.g., Grade 984L) from Kimberly-Clark Filtration Products, Neenah, Wis., and "LYDAIR MG" (e.g., Grade 1224B) from Lydall Filtration/Separation, Inc., Manchester, Conn. Methods of forming of filter media 36 into suitable configurations such as pleats 38 of various pleat depths and pleat spacings are known in the art.

Figure 1:
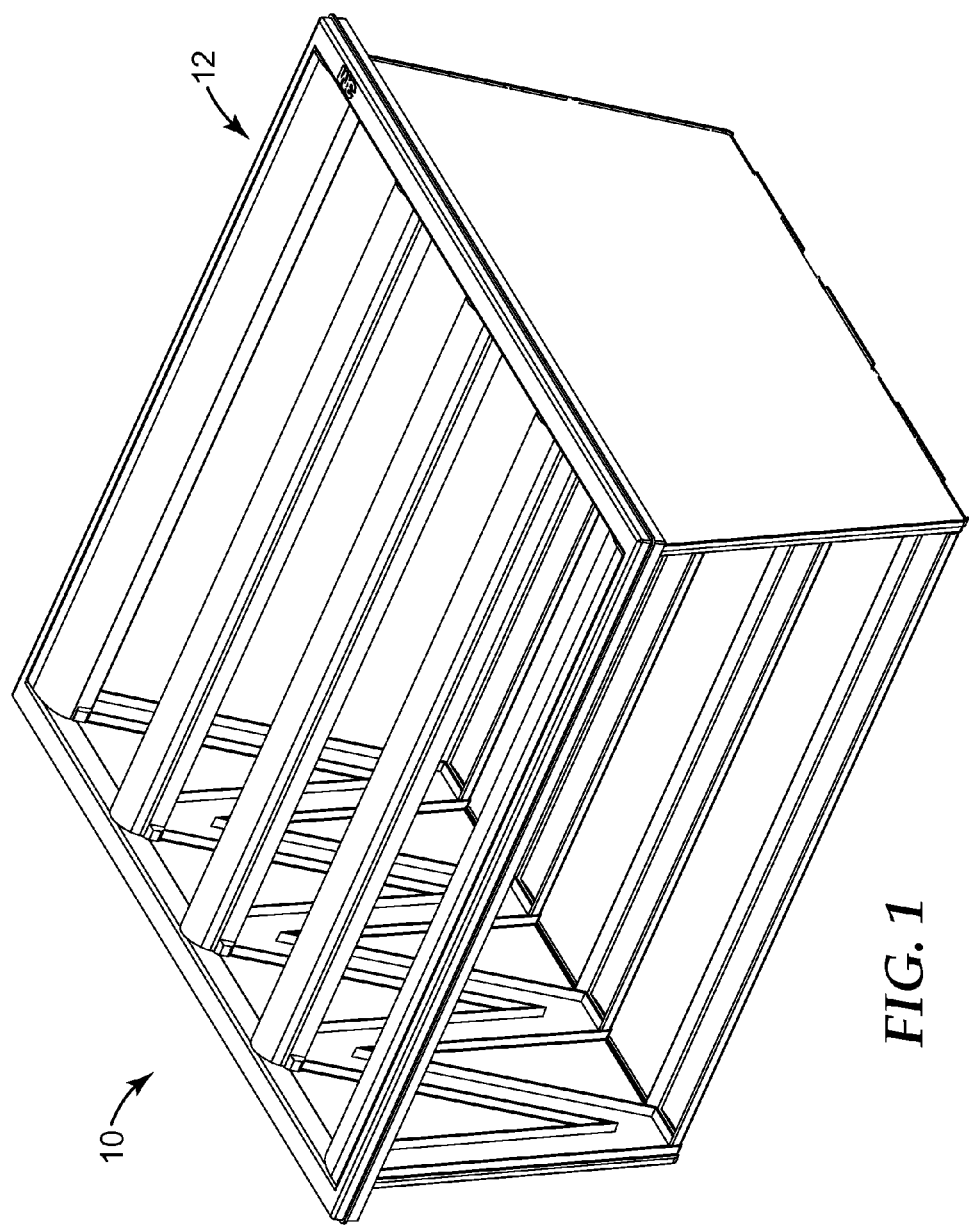
FIG. 1 is a perspective view of an exemplary filter frame assembly described herein.
Figure 1A:
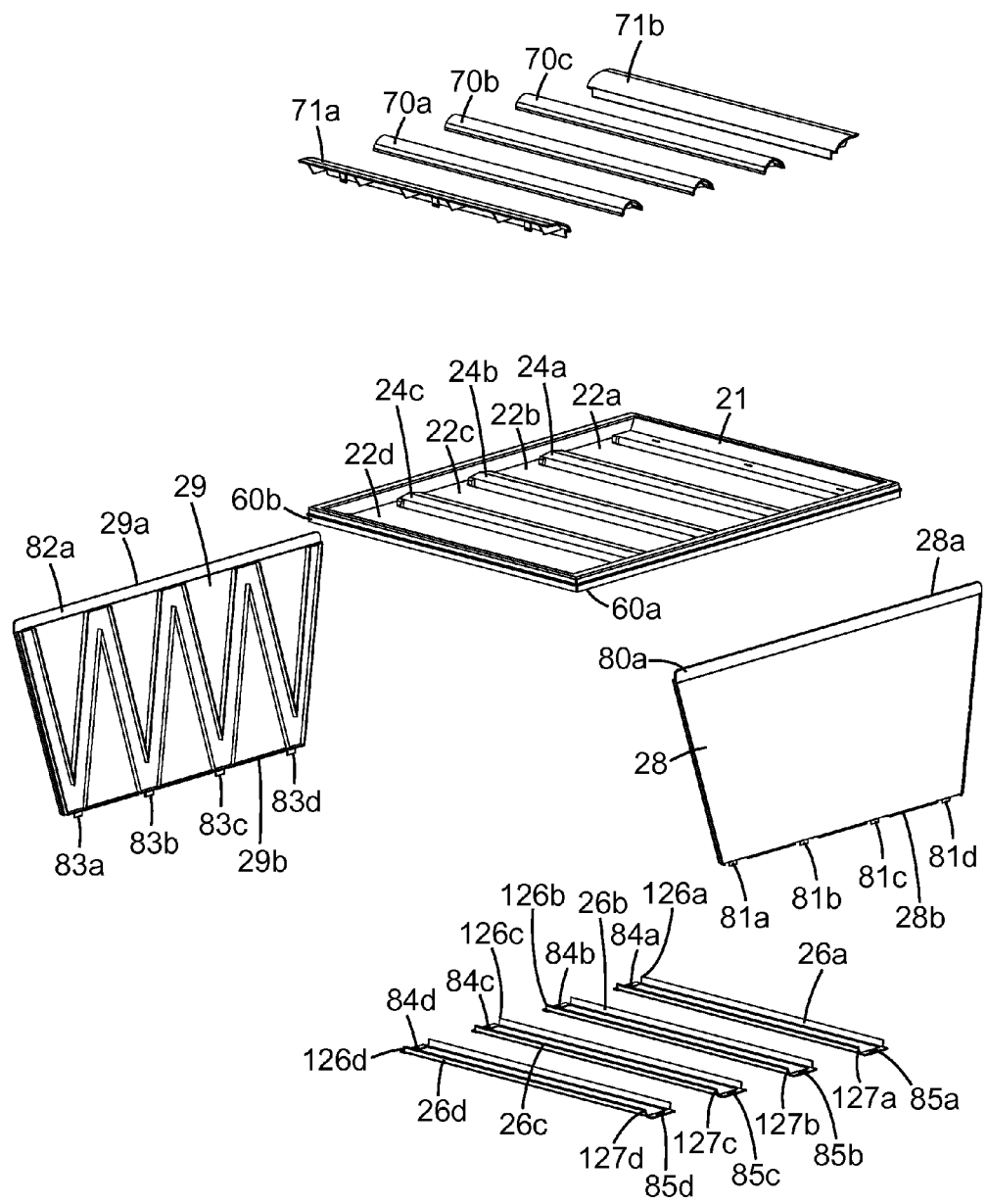
FIG. 1A is an exploded view of parts of the exemplary filter frame assembly shown in FIG. 1.

The present disclosure further provides particular filter frame assemblies 10 that may be described as "V-bank" assemblies. Such V-bank assemblies may or may not employ a gasket carrier 40 as described herein. Referring to FIG. 1, an exemplary filter frame assembly 10 described herein 10 has cage 12. Referring to FIG. 1A, cage 12 comprises exemplary perimeter member 21 having fluid apertures 22*a*, 22*b*, 22*c*, 22*d*. (In this example, four fluid apertures 22*a*-22*d* are exemplified, but as few as one and as many as five fluid apertures 22 or more are disclosed herein, including two, three, and four fluid apertures 22 or 22*a*-22*d*). Fluid apertures 22*a*, 22*b*, 22*c*, 22*d* are generally traversed by primary cross member 24*a*, 24*b*, 24*c*, cross member 24*a*, 24*b*, 24*c* being a continuous portion of perimeter member 21 (i.e., 21 and 24*a*, 24*b*, 24*c* together are a single piece as might be formed, for example, in an injection molding process in a single molding tool). Fluid apertures 22*a*-22*d* are generally traversed by secondary cross members 26*a*, 26*b*, 26*c*, 26*d* having a first end 126*a*, 126*b*, 126*c*, 126*d* and a second end 127*a*, 127*b*, 127*c*, 127*d*. First and second wall members 28, 29 each have first (28*a*, 29*a*) and second end (28*b*, 29*b*). Each first end 28*a*, 29*a* is connected to perimeter member 21 and each second end 28*b*, 29*b*, is respectively connected to the first and second ends of secondary cross members 26*a*, 26*b*, 26*c*, 26*d*.

Figure 2:
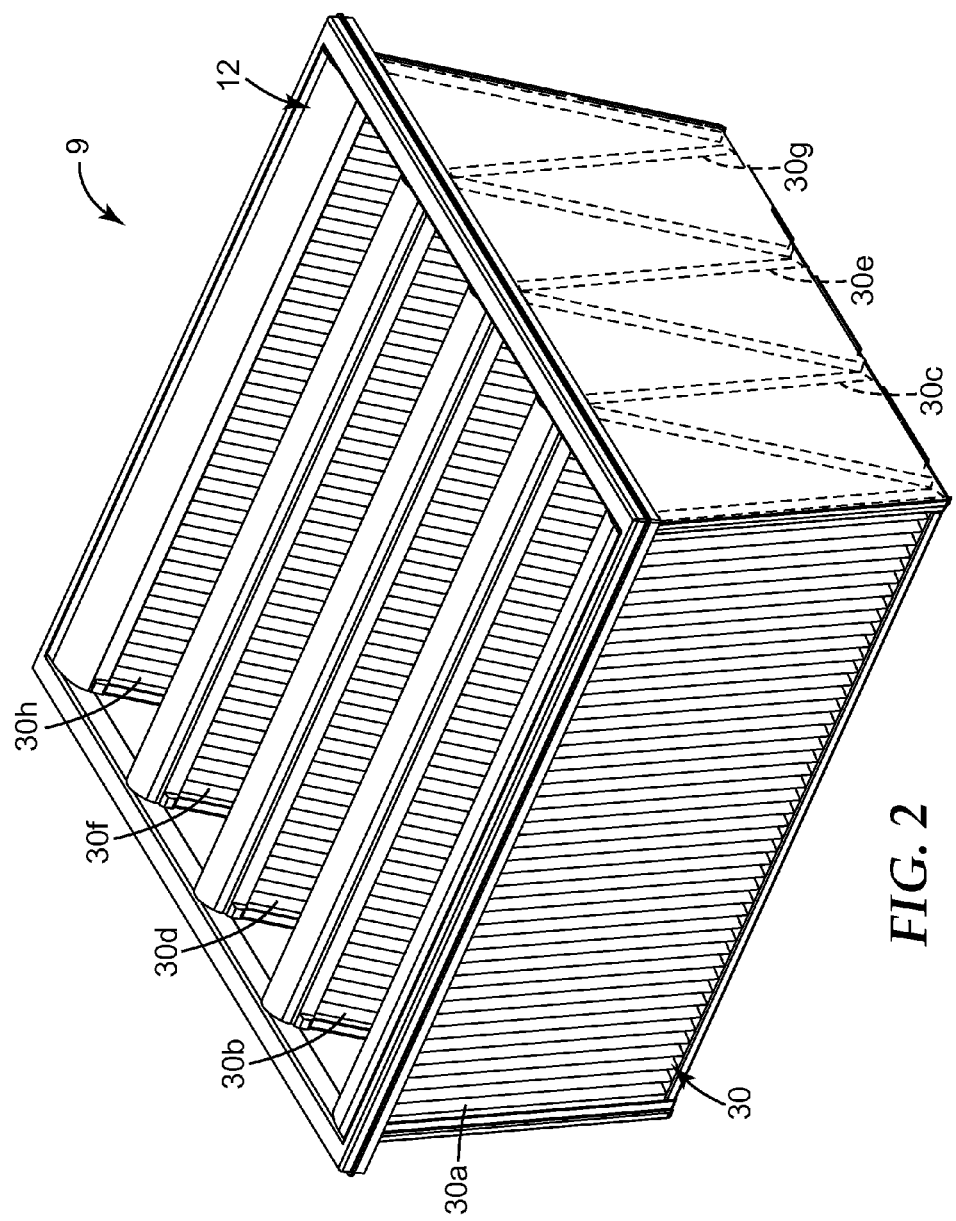
FIG. 2 is a perspective view of an exemplary filter assembly that is the filter frame assembly shown in FIG. 1 with filter media.
Figure 2A:
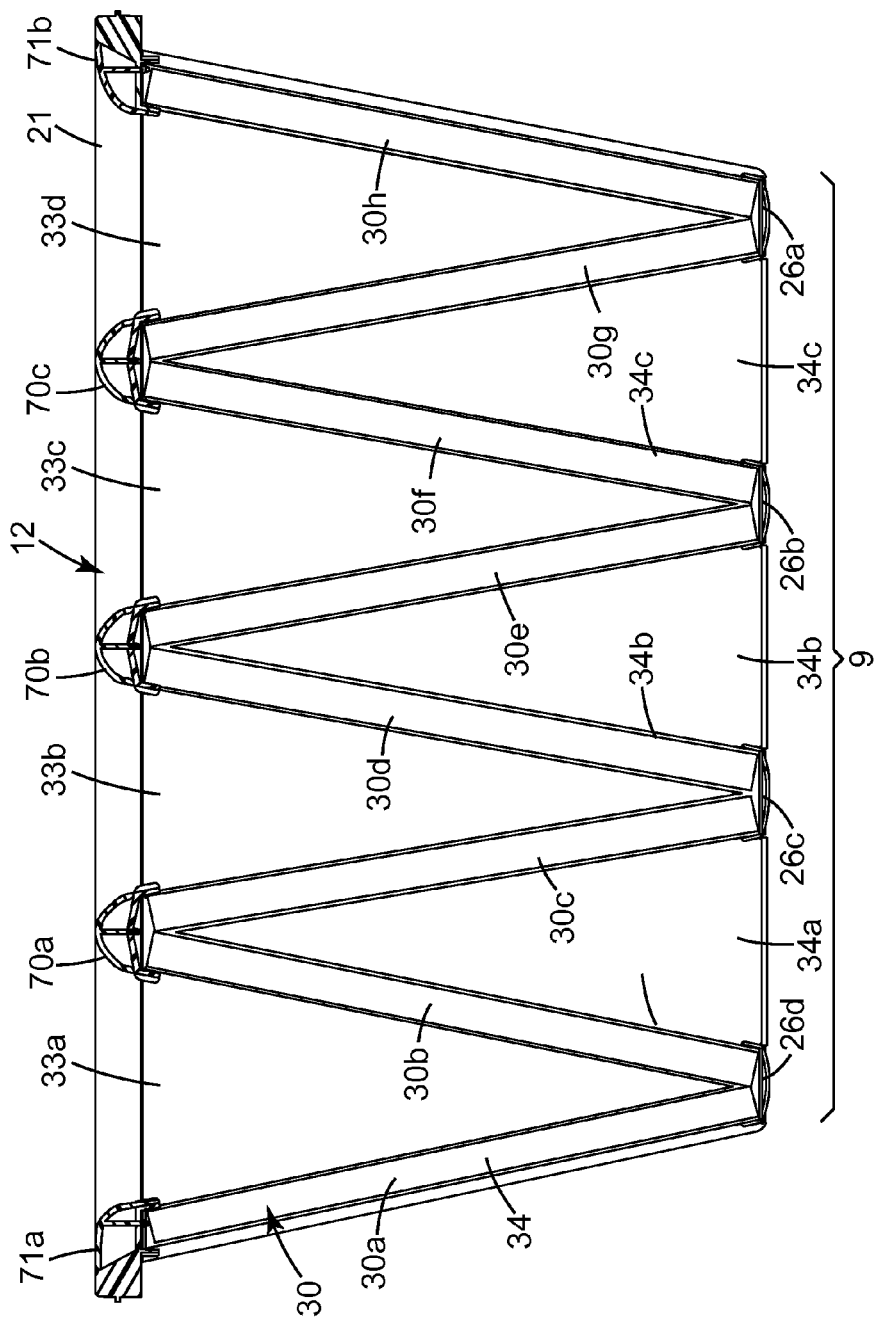
FIG. 2A is cross-sectional view of the filter assembly shown in FIG. 2.
Figure 3A:
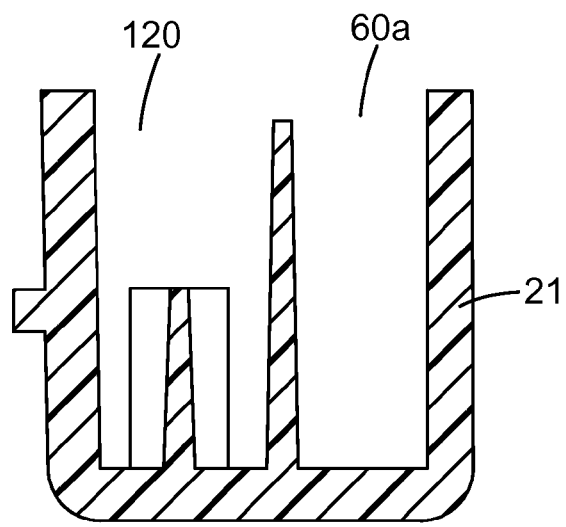
FIG. 3A is a cross-sectional view taken at 3A-3A of FIG. 3, of a portion of the perimeter member shown in FIG. 3.
Figure 4:
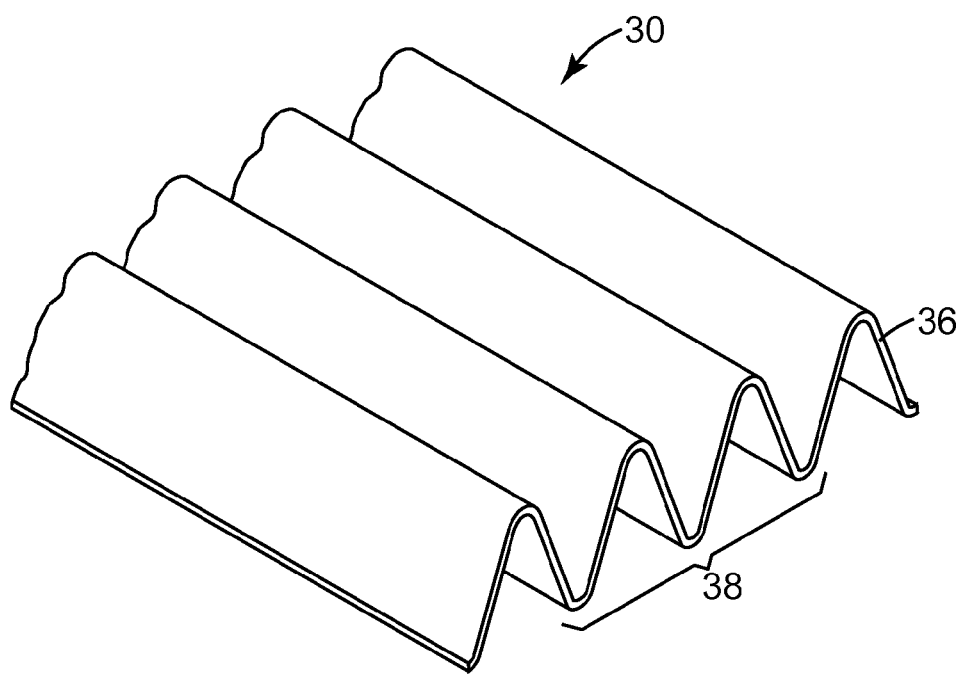
FIG. 4 is perspective of a section of filter media shown in FIGS. 2 and 2A.

Referring to FIG. 2, filter assembly 9 comprises a filter element 30 comprising filter element sections 30*a*, 30*b*, 30*c*, 30*d*, 30*e*, 30*f*, 30*g*, 30*h* (filter element sections 30*c*, 30*e* and 30*g* cannot be seen in the perspective view in FIG. 2) each comprising filter media 36 formed into a plurality of pleats 38 as shown in FIG. 4. Cage 12 generally surrounds filter element 30. Sections 30*a*, 30*b*, 30*c*, 30*d*, 30*e*, 30*f*, 30*g*, 30*h* are arranged in a successive V-pattern as shown in FIG. 2A, having portions 33*a*, 33*b*, 33*c*, 33*d* corresponding to fluid apertures 22a, 22b, 22c, 22d and opposite portions 34a, 34b, 34c. Each portion 33a, 33b, 33c, 33d corresponds to a fluid aperture 22a, 22b, 22c, 22d. Each opposite portion 34a, 34b, 34c ends at secondary cross members 26a, 26b, 26c, 26d. Each section of filter element 30a, 30b, 30c, 30d, 30e, 30f, 30g, 30h is secured in sealing relation to adjacent sections 30a and to cage 12 (e.g., via an adhesive material). Perimeter member 21 includes female engagement features 60a, 60b as shown in FIGS. 3 and 3A. Wall members 28, 29 include male engagement features 80a, 81a, 81b, 81c, 81d, 82a, 83a, 83b, 83c, 83d. Secondary cross members 26 include female engagement features 84a, 84b, 84c, 84d, 85a, 85b, 85c, 85d. Male engagement features 80a, 82a engage with corresponding female reception features 60a, 60b. Further, male engagement features 81a, 81b, 81c, 81d, 83a, 83b, 83c, 83d engage with corresponding female reception features 84a, 84b, 84c, 84d, 85a, 85b, 85c, 85d. Optionally, male engagement features 80a may be designed to snap into corresponding female reception features 60a (i.e., the male engagement feature may have an additional protrusion and/or the female reception area may have an undercut such that when the male engagement feature is placed into the female reception feature, the male engagement features 80a flexes slightly during placement and then flexes again ("snaps") so that the additional protrusion and/or undercut provides a mechanical interlock). Male engagement features 80a designed to snap into female reception features 60a are known to those skilled in the art.

Optionally, filter frame assembly (10) has flow directing members 70a, 70b, 70c, 71a, 71b connected to an upstream-facing portion of filter frame assembly 10, such as a portion of perimeter member 21 and/or primary cross member 24a, 24b, 24c of if included on perimeter member 21.

Optionally, perimeter member 21 includes inner surface 120 and gasket landing member 74 connected to inner surface 120 of perimeter member 21 (see, e.g., FIG. 5).

Figure 6:
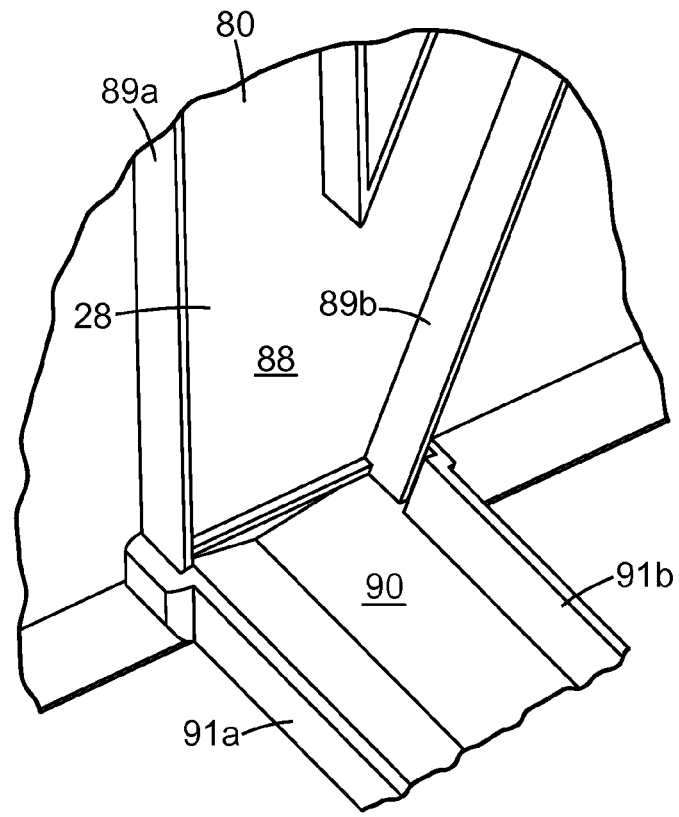
FIG. 6 is a perspective view of a portion of a frame and a portion of ends showing a telescoping sealing channel.

Optionally, perimeter member 21, wall members 28, 29 and secondary cross members 26a, 26b, 26c, 26d include at least one (and as many as twenty or more) matching sealing channels 80 (see, e.g., FIG. 6). Matching sealing channel 80 is formed from the sides 91a, 91b of channel 90 on secondary cross members 26a, 26b, 26c, 26d, which is matched to the sides 89a, 89b of sealing channel 88 on wall member 28. Matching sealing channels 80 may provide improved structural integrity and/or improved sealing or potting of filter media 36 to the filter frame (as discussed below).

Methods of making filter assemblies by assembling filter frame components and filter media 36 in various configurations are known in the art. Adhesive materials for assembling filter frames and filter media 36 include hot melt adhesives and curable adhesives (e.g., a two-part urethane or a two-part epoxy). Further, in some embodiments, it may be desirable to utilize joined filter media as described in U.S. Pat. Pub. No. 2010/0269463 A1 to Duffy entitled "Joined Filter Media Packs," the disclosure of which is hereby incorporated by reference in its entirety.

It may be desirable to seal or pot filter media 36 to filter frame members, in order to reduce or prevent the flow of gas (e.g., air) around the filter media 36. In some embodiments, adhesives (e.g., hot melt adhesives and curable adhesives (e.g., two-part urethanes)) may be used for this purpose.

In some installations where a gasket carrier 40 is not employed, a separate gasketing material may be used to help reduce leakage between the filter frame and the hvac duct 200, more specifically, the portion 33a of the hvac duct 200 to which the filter is mounted. For example, referring to FIG. 5, such gasket material 101 is typically at least one (up to four or more) strip of conformable material (e.g., a solid material of open-cell foam or a closed-cell foam made of polymers such as polyurethane, propylene, ethylene, ethylene-propylene-diene copolymers, polychloroprene and natural rubber). Optionally, for example, a pressure-sensitive adhesive is applied to at least one surface of the gasket to help position and hold the gasket during filter installation. The gasket is placed between filter frame and HVAC duct 200 as shown in FIG. 5. Optional gasket landing member 74 placed in perimeter member 21 provides an area for gasket sealing. Optionally, gasket landing 74 has dimension 121 that is smaller than perimeter dimension 122, so that gasket material 101 is under higher pressure at edge 123. A tighter and more reliable seal may be obtained due to this "pinch point." Optionally, perimeter member 21 includes an edge 123 that provides a single continuous pinch point for the purpose of sealing to gasket material 101 (see e.g., FIG. 3).

Various modifications and alterations of the invention will be apparent to those skilled in the art without departing from the spirit and scope of the invention. It should be understood that the invention is not limited to illustrative embodiments set forth herein.

What is claimed is:

1. A filter assembly comprising:
a unitary perimeter member surrounding a fluid aperture adapted to accommodate a fluid flow from an upstream direction to a downstream direction, the perimeter member comprising a perimeter upstream surface extending inwardly toward the fluid aperture, a perimeter downstream surface extending inwardly toward the fluid aperture, and a perimeter outer surface connecting the perimeter upstream surface to the perimeter downstream surface;
a filter media spanning the fluid aperture, the filter media positioned between the perimeter upstream surface and the perimeter downstream surface with the perimeter upstream surface and the perimeter downstream surface covering at least a portion of the filter media; and
a gasket carrier attached to the perimeter outer surface and comprising a carrier outer portion facing generally away from the fluid aperture and a first outer portion sealing member projecting from the carrier outer portion.

2. The filter frame assembly of claim 1 wherein the gasket carrier further comprises a carrier upstream portion generally facing the upstream direction.

3. The filter frame assembly of claim 2 wherein the gasket carrier further comprises an upstream sealing member projecting from the carrier upstream portion.

4. The filter frame assembly of claim 1 wherein the gasket carrier further comprises a carrier downstream portion generally facing the downstream direction.

5. The filter frame assembly of claim 4 wherein the gasket carrier further comprises a downstream sealing member projecting from the carrier downstream portion.

6. The filter frame assembly of claim 1 wherein the gasket carrier comprises a carrier upstream portion generally facing the upstream direction and a carrier downstream portion generally facing the downstream direction, the carrier outer portion connecting the carrier upstream portion to the carrier downstream portion.

7. The filter frame assembly of claim 6 further comprising at least one of a downstream sealing member projecting from the carrier downstream portion or an upstream sealing member projecting from the carrier upstream portion.

8. The filter frame assembly of claim 7 comprising both a downstream sealing member projecting from the carrier downstream portion and an upstream sealing member projecting from the carrier upstream portion.

9. The filter frame assembly of claim 1 comprising a second outer portion sealing member projecting from the carrier outer portion, wherein the first outer portion sealing member is positioned more proximate the upstream direction than the second outer portion sealing member.

10. The filter frame assembly of claim 1 wherein the perimeter member comprises four members arranged in a rectangle.

11. The filter frame assembly of claim 10 wherein the gasket carrier comprises four portions, one portion being attached to each member of the perimeter member.

12. The filter frame assembly of claim 11 wherein the four portions of the gasket carrier are not connected to one another.

13. The filter frame assembly of claim 1 wherein the gasket carrier is attached to the perimeter member by an adhesive.

14. The filter frame assembly of claim 1 wherein the gasket carrier is attached to the perimeter member by a clip feature.

15. The filter frame assembly of claim 14 wherein the clip feature is integrally formed onto one of the gasket carrier or the perimeter member such that the clip feature slides over a clipping member on the other to secure the clip feature over the clipping member by friction.

16. The filter frame assembly of claim 15 wherein the gasket carrier is sufficiently resilient to bend to permit the clip feature to slide over the clipping member.

17. The filter frame assembly of claim 16 wherein the gasket carrier comprises the clip feature and the perimeter member comprises the clipping member.

18. The filter frame assembly of claim 1 wherein the gasket carrier is attached to the perimeter member by a snap feature.

19. The filter frame assembly of claim 18 wherein the snap feature comprises a recess on one of the perimeter member or the gasket carrier and a protrusion on the other to snap into the recess.

20. The filter frame assembly of claim 19 wherein the gasket carrier is sufficiently resilient to bend to permit the protrusion and the recess to snap together.

21. The filter frame assembly of claim 19 wherein the perimeter member comprises a recess and the gasket carrier comprises a protrusion.

22. The filter frame assembly of claim 21 wherein the perimeter member comprises a recess on each of the perimeter upstream surface and the perimeter downstream surface; and
wherein the gasket carrier comprises a protrusion projecting inwardly from the carrier upstream portion to snap into the recess on the perimeter upstream surface and a protrusion projecting inwardly from the carrier downstream portion to snap into the recess on the perimeter downstream surface.

23. The filter frame assembly of claim 1 wherein the gasket carrier is attached to the perimeter member by a press feature.

24. The filter frame assembly of claim 23 wherein the press feature comprises a reception channel on one of the perimeter member or the gasket carrier and a plug on the other to press into the reception channel.

25. The filter frame assembly of claim 24 wherein the perimeter member comprises a reception channel and the gasket carrier comprises a plug.

26. The filter frame assembly of claim 24 wherein plug comprises one or more retention features to cooperate with an inner wall of the reception channel to resist removal of the plug from the reception channel.

27. The filter frame assembly of claim 1 wherein the perimeter member defines a perimeter direction along the perimeter member, wherein the gasket carrier is attached to the perimeter member by a slide feature such that the gasket carrier slides onto the perimeter member along the perimeter direction.

28. The filter frame assembly of claim 27 wherein the slide feature comprises a slot on one of the perimeter member or the gasket carrier and a rail on the other to slide into the slot.

29. The filter frame assembly of claim 28 wherein the perimeter member comprises a slot and the gasket carrier comprises a rail.

30. The filter frame assembly of claim 28 wherein the slot and the rail cooperate in a dovetail configuration.

31. The filter frame assembly of claim 6 wherein the gasket carrier comprises independent first and second carrier portions, the first carrier portion comprising a carrier upstream portion and a portion of the carrier outer portion; the second carrier portion comprising a carrier downstream portion and the remaining portion of the carrier outer portion.

32. The filter frame assembly of claim 31 comprising both a downstream sealing member projecting outwardly from the carrier downstream portion and an upstream sealing member projecting outwardly from the carrier upstream portion.

33. The filter frame assembly of claim 31 comprising a second outer portion sealing member projecting from the carrier outer portion, wherein the first outer portion sealing member is positioned on the first carrier portion and the second outer portion sealing member is positioned on the second carrier portion.

34. A filter frame assembly comprising:
a perimeter member surrounding a fluid aperture, the perimeter member comprising a perimeter upstream surface, a perimeter downstream surface, and a perimeter outer surface connecting the perimeter upstream surface to the perimeter downstream surface; and
a gasket carrier attached to the perimeter member by a snap feature and comprising a carrier upstream portion, a carrier downstream portion, and a carrier outer portion connecting the carrier upstream portion to the carrier downstream portion; the gasket carrier further comprising:
a first outer portion sealing member projecting outwardly from the carrier outer portion;
a downstream sealing member projecting outwardly from the carrier downstream portion; and
an upstream sealing member projecting outwardly from the carrier upstream portion;
the snap feature comprising a recess on each of the perimeter upstream surface and the perimeter downstream surface, a protrusion projecting inwardly from the carrier upstream portion to snap into the recess on the perimeter upstream surface, and a protrusion projecting inwardly from the carrier downstream portion to snap into the recess on the perimeter downstream surface, wherein the gasket carrier is sufficiently resilient to bend to permit the protrusions and the recesses to snap together.

35. The filter assembly of claim 34 wherein the filter media comprises two sections arranged in a V-pattern having an open portion and a closed portion, wherein the open portion corresponds to a fluid aperture.

36. The filter assembly of claim 35 wherein the filter media comprises four sections arranged in a successive V-pattern having an open portion and a closed portion, wherein each open portion corresponds to a fluid aperture.

37. A filter frame assembly comprising:
a cage comprising a perimeter member surrounding at least two fluid apertures, the at least two fluid apertures being generally traversed by at least one primary cross member, at least one secondary cross member having a first end and a second end, and first and second wall members each having a first and second end, wherein each first end of each wall member is connected to the perimeter member and each second end of each wall member is respectively connected to the first and second ends of the at least one secondary cross member, the perimeter member comprising:
a perimeter upstream surface, a perimeter downstream surface, and a perimeter outer surface connecting the perimeter upstream surface to the perimeter downstream surface;
a gasket carrier attached to the perimeter member and comprising a carrier outer portion facing generally away from the fluid apertures and a first outer portion sealing member projecting from the carrier outer portion; and
a filter element having at least four sections;
wherein the cage generally surrounds the filter element, wherein the at least four sections of the filter element are arranged in a successive V-pattern having an open portion and a closed portion, wherein each open portion corresponds to a fluid aperture and each closed portion corresponds to a secondary cross member; and
wherein each section of the filter element is secured in sealing relation to adjacent sections and to the cage.

38. The filter frame assembly of claim 37, wherein the perimeter member comprises polymeric material comprising at least one of acrylonitrile butadiene styrene, polycarbonate, or high impact polystyrene.

39. The filter frame assembly of claim 37, wherein the first and second wall members each comprise polymeric material independently comprising at least one of acrylonitrile butadiene styrene, polycarbonate, or high impact polystyrene.

40. The filter frame assembly of claim 37, wherein the sealing relation of each section of the filter element to adjacent sections and to the cage is provided at least in part by an adhesive comprising at least one of a hot melt adhesive or a curable adhesive.

41. The filter frame assembly of claim 37, wherein each of the at least four sections of the filter element is a discrete pleat pack.

42. The filter frame assembly of claim 37, wherein the perimeter member further comprises at least one male engagement feature or female reception feature, and the first end of each wall member further comprises at least one corresponding male engagement feature or female reception feature, wherein each male engagement feature is engaged with a corresponding female reception feature.

43. The filter frame assembly of claim 37, wherein the second end of each wall member further comprises at least one male engagement feature or female reception feature, and the at least one secondary cross member further comprises at least one corresponding male engagement feature or female reception feature, wherein each male engagement feature is engaged with a corresponding female reception feature.

44. The filter frame assembly of claim 37, further comprising at least one flow directing member connected to each at least one primary cross member.

* * * * *